US009860225B1

(12) United States Patent
Chamberlin et al.

(10) Patent No.: US 9,860,225 B1
(45) Date of Patent: Jan. 2, 2018

(54) NETWORK DIRECTORY AND ACCESS SERVICE

(71) Applicant: AMAZON TECHNOLOGIES, INC., Reno, NV (US)

(72) Inventors: Roderick Peter Chamberlin, Seattle, WA (US); Michael Ellsworth Bundy, Seattle, WA (US); Timothy Craig Worsley, Seattle, WA (US); Charles Edward Rice, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 112 days.

(21) Appl. No.: 14/279,216

(22) Filed: May 15, 2014

(51) Int. Cl.
*G06F 9/00* (2006.01)
*H04L 29/06* (2006.01)

(52) U.S. Cl.
CPC .................................... *H04L 63/08* (2013.01)

(58) Field of Classification Search
CPC ................................................. H04L 2209/76
USPC ...................................................... 726/11, 12
See application file for complete search history.

(56) References Cited

U.S. PATENT DOCUMENTS

| | | | | |
|---|---|---|---|---|
| 6,324,648 B1* | 11/2001 | Grantges, Jr. | ........... | H04L 63/02 709/229 |
| 6,493,349 B1* | 12/2002 | Casey | ................. | H04L 12/4675 370/409 |
| 7,577,136 B1* | 8/2009 | Devanagondi | .......... | H04L 47/10 370/389 |
| 8,750,280 B2* | 6/2014 | Chaturvedi | ............. | H04L 45/00 370/349 |
| 2004/0054967 A1* | 3/2004 | Brandenberger | ... | G06F 17/3089 715/255 |
| 2004/0193956 A1* | 9/2004 | Greenlee | ............. | G06F 11/2252 714/25 |
| 2010/0115267 A1* | 5/2010 | Guo | .................... | H04L 63/0823 713/156 |

\* cited by examiner

*Primary Examiner* — Christopher Brown
(74) *Attorney, Agent, or Firm* — Lowenstein Sandler LLP

(57) ABSTRACT

A network directory service, responsive to receiving a target device symbolic name from a client, identifies a network access server in communication with a network on which the target device resides, notifies the network access server of an expected connection from the client, and returns a device access token to the client. The network access server, responsive to receiving and validating the device access token, forwards the client-originated traffic to the target device by implementing a Network Address Translation (NAT) scheme.

18 Claims, 8 Drawing Sheets

NETWORK DIRECTORY AND ACCESS SERVICE

BACKGROUND

Private Internet Protocol (IP) address spaces may be employed to prevent exhaustion of the globally unique IP address space and/or to improve security of a distributed computer system. Interconnecting a network using private IP address spaces to the Internet may be performed by a router interconnecting a private network to the Internet, by implementing network address translation (NAT). NAT may involve substituting IP addresses within packets being routed according to a configurable set of rules. In an illustrative example, NAT may be employed for implementing IP masquerading, which is a technique that hides a private IP network behind a single IP address in a different IP address space. Various solutions may be employed for providing inbound connectivity to a private IP network which is connected to the Internet using the IP masquerading technique.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

DETAILED DESCRIPTION

Figure 1:
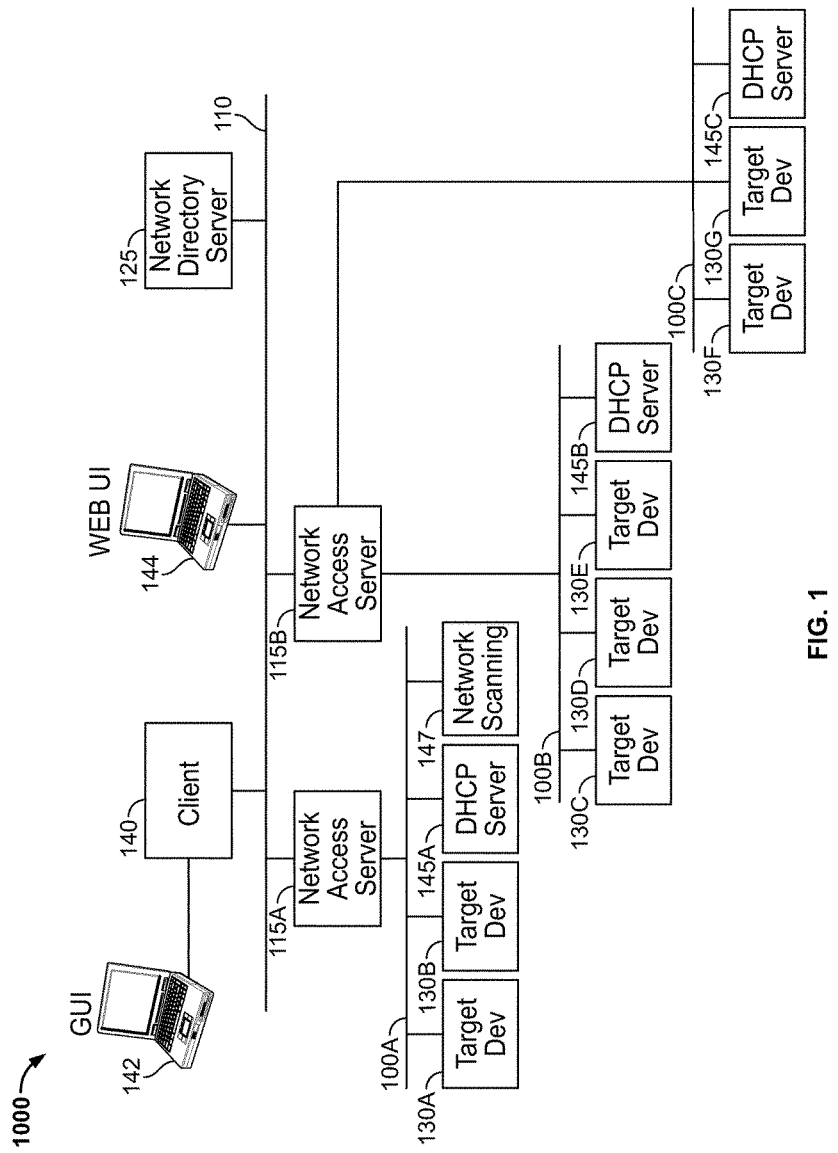
FIG. 1 is a high-level component diagram of an illustrative example of a distributed computer system in accordance with one or more aspects of the present disclosure.

Described herein are systems and methods for providing inbound connectivity to networks that employ private address spaces ('private address space networks'). A private address space may be represented by an internet protocol (IP) address space containing IP addresses that are unambiguous within the address space, but may be ambiguous between different address spaces (e.g., as defined by RFC-1918 "Address allocation for private Internets").

Although using private address spaces within enterprise networks may be a suitable design choice dictated, e.g., by security considerations and/or by an attempt to prevent exhaustion of the globally unique network address space, such a design choice may present various network architecture challenges, including those related to connectivity, host addressing, host discovery and/or other architectural aspects.

The outbound connectivity for hosts residing on a private address space network may be straightforwardly provided by a router implementing network address translation (NAT) to substitute source network addresses within the outgoing packets by the network address of the external interface of the router. However, implementing the inbound connectivity for those hosts may involve designing various address translation schemes to implement "one to many" relationship between the network address of the external interface of the router and network addresses of network interfaces residing on the private address space network. Alternatively, the inbound connectivity for the hosts residing on a private address space network may be facilitated by a proxy server operating at and/or above the transport layer of the Open Systems Interconnection (OSI) model.

Furthermore, implementing a NAT scheme and/or a proxy server for providing the inbound connectivity would not solve the name resolution problem with respect to the hosts on the private address space network if those hosts are to be accessible by hosts residing on the external, with respect to the network address translating router, network. Employing a domain name system (DNS) server to resolve host names of the hosts residing on the private address space network in a situation where those hosts are to be reachable by hosts residing on the external network would not be compatible with most NAT schemes.

Furthermore, should two or more private address space networks be interconnected to a third network via two or more routers, a client residing on the third network should also be able to determine which of the two or more routers may provide connectivity to a particular host residing on one of the private address space networks. No existing internet protocol or service would perform the router identification task.

The methods and systems disclosed herein facilitate the inbound connectivity, router discovery and other related architectural aspects with respect to networks employing private network address spaces, by providing a network directory service and a network access service functioning as described in more details herein below. In an illustrative example, a network which is for illustrative purposes designated as "central network," may be interconnected to two or more private address space networks via one or more network access servers. A client residing on the central network may need to communicate to a target device (e.g., a computer, a printer or another networked peripheral device) residing on one of the private address space networks. The client may transmit a request comprising the target device identifier (e.g., an alphanumeric string identifying the target device) to a network directory server. The network directory server may, upon authenticating the client and verifying the client's authorization to access the requested target device, identify the private address space network on which the target device resides. The network directory server may further identify the network access server that is capable of routing the client's requests to the identified private address space network. Then the network directory server may issue a device access token that the requesting client would present to the identified network access server in order to access the target device. The network directory server may transmit, to the identified network access service, a notification of an expected service access request that may be issued by the requesting client. The network directory server may transmit, to the client, the device access token and the identifier of the network access server. Responsive to receiving the device access token and the network access server identifier, the client may transmit a service access request to the network access server. The network access server may validate the service access request and then forward the request to the address of the target device on the private address space network (e.g., by implementing a NAT scheme or a proxy server, as described in more details herein below). Accordingly, systems and methods described herein enable clients residing on the central network to communicate with target devices residing on one or more private address space networks that are interconnected with the central network.

Various aspects of the above referenced methods and systems are described in details herein below by way of example, rather than by way of limitation.

FIG. 1 is a high-level component diagram of an illustrative example of a distributed computer system 1000, in accordance with one or more aspects of the present disclosure. Distributed computer system 1000 may include one or more computing devices interconnected by one or more networks.

As schematically illustrated by FIG. 1, distributed computer system 1000 may include one or more private address space networks 100A-100C interconnected to a network 110 (which is for illustrative purposes designated as "central network") via one or more network access servers 115A-115B. In certain implementations, distributed computer system 1000 may represent an enterprise network. Alternatively, distributed computer system 1000 may represent various other public and/or private networks.

Private address space networks 100A-100C may use one or more private address spaces (e.g., private IP address spaces). In certain implementations, two or more private address space networks 100A-100C may share the same private address space. Alternatively, each of the private address space networks 100A-100C may use a private address space which is different from private address spaces used by other private address space networks 100A-100C.

Central network 110 may employ the globally unique address space (e.g., a subset of the Internet public address space) or a private address space. The address space of central network may be shared with one or more private address space networks 100A-100C or may be different from private address spaces used by other private address space networks 100A-100C.

Distributed computer system 1000 may further include a network directory service provided by one or more network directory servers 125 that may be programmed to store, in a memory and/or on a storage device, network directory records representing various devices 130A-130G (e.g., printers, desktop computers, laptop computers, tablet computers, smartphones, monitors, conference phones, storage devices, and so on) residing on private address space networks 100. In an illustrative example, a network directory record may include an enterprise-wide unique identifier of a device 130A-130G, an identifier of network access server 115A-115B that interconnects central network 110 to a particular private address space network 100A-100C on which the device 130A-130G resides. In certain implementations, the network directory record may further include the address of the target device 130A-130G on the private address space network 100A-100C.

In certain implementations, the network directory record may further include one or more device descriptors for the target device. In an illustrative example, a first device descriptor may designate the device category (e.g., printers, workstations, imaging devices, etc.). In another illustrative example, a second device descriptor may designate the device model. In another illustrative example, a third device descriptor may designate a value of a parameter of the target device (e.g., the device physical location). In another illustrative example, a fourth device descriptor may designate the security scheme to be implemented by the network access server for communicating to the target device (e.g., a secure socket layer (SSL) connection, an X.509 certificate-based authentication, or a shared secret-based encryption).

In various examples, the network directory service may have an integrated or external administrative user interface (e.g., a graphical user interface (GUI) integrated within the computing device of network directory server 125 or a web user interface 144 connected to one or more network directory servers 125 via one or more networks). One or more network access servers 115A-115B may also have an integrated or external administrative user interface (e.g., a GUI integrated within the computing device of network access servers 115A-115B or a web user interface connected to one or more network access servers 115A-115B via one or more networks). In certain implementations, web user interface 144 may provide an administrative user interface for one or more of network directory servers 125 and one or more network access servers 115. The administrative user interface may be employed for configuring various aspects of the network directory service and/or network access service (e.g., inspecting and/or modifying directory records associated with target devices).

In certain implementations, one or more network directory servers 125 and/or one or more network access servers 115A-115B may have an administrative application programming interface (API) which may be represented, e.g., by one or more Simple Object Access Protocol (SOAP) web services. The administrative API may be employed for configuring various aspects of the network directory service and/or network access service (e.g., inspecting and/or modifying directory records associated with target devices).

In certain implementations, the network directory service may perform device discovery with respect to the devices residing on private address space networks 100A-100C. In an illustrative example, the network directory service may discover devices 130A-130G by analyzing the network addresses assigned, to various network devices identified by Media Access Control (MAC) addresses, by a dynamic host configuration protocol (DHCP) server 145A-145C that is servicing one or more private address space networks 100A-100C (e.g., by analyzing DHCP server logs, receiving notifications from the DHCP server or sniffing the DHCP traffic on private address space networks 100A-100C). In another illustrative example, the network directory service may employ a network scanning agent installed on one or more hosts (e.g., DHCP servers 145A-145C or a dedicated network scanning host 147) on one or more of the private address space networks 100A-100C to discover devices 130A-130G residing on those networks by scanning those networks. In another illustrative example, the network directory service may employ a traffic sniffing agent installed on one or more hosts (e.g., DHCP servers 145A-145C, dedicated network scanning host 147, or a dedicated network sniffing host (not shown in FIG. 1)) on one or more of the private address space networks to perform the network traffic sniffing. The network directory service may then analyze sniffing logs generated by the traffic sniffing agents to discover devices 130A-130G residing on the private address space networks 100A-100C. In another illustrative example, the network directory service may discover devices 130A-130G residing on the private address space networks 100A-100C by inspecting state information of network devices, e.g., by analyzing Address Resolution Protocol (ARP) tables on network devices connected to private address space networks 100A-100C). In another illustrative example, the network directory service may discover devices 130A-130G by receiving messages (e.g., device capability advertisements) broadcasted by those devices.

In certain implementations, the network directory service may, as part of the device discovery process, determine one or more device descriptors for each target device, to designate the device category, the device model, and/or device parameter values, as described in more details herein above.

In certain implementations, the network directory service may perform a device health check with respect to the devices residing on private address space networks 100A-100C. In an illustrative example, network directory server 125 may determine the communication status of a target device (e.g., target device 130A) by communicating over a network with the target device, for example, by transmitting an Internet Control Message Protocol (ICMP) echo request to the target device 130A and registering the active status of the target device 130A upon receiving an ICMP echo response corresponding to the ICMP echo request. In another illustrative example, network directory server 125 may determine the communication status of a particular service on a target device by establishing a Transmission Control Protocol (TCP) connection to the service. In another illustrative example, network directory server 125 may perform a device-specific procedure for ascertaining the communication status of a particular target device and/or a particular service on the target device. In another illustrative example, network directory server 125 may determine the communication status of a target device by inspecting state information of the target device, e.g., by analyzing ARP tables on network devices connected to private address space networks 100A-100C.

In various implementations, network directory server 125 may be configured to perform the target device health check periodically, according to a pre-defined schedule, or responsive to detecting a triggering event (e.g., receiving a network directory service notification of an expected client connection).

In certain implementations, a network access server may include three or more network interfaces, and thus may interconnect central network 110 to two or more private address space networks 100A-100C. In the illustrative example of FIG. 1, network access server 115B interconnects central network 110 to private address space networks 100B and 100C. In certain implementations, one or more network access servers 115A-115B (each having two or more network interfaces) may be collocated, on a single computing device, with network directory server 125.

Distributed computer system 1000 may further include other components, including, e.g., network segments, user directory servers, presentation servers, application servers, database servers, network switches, network access servers, firewalls and/or load balancers, which are omitted from FIG. 1 for clarity. For example, a filtering firewall may be located in front of network directory server 125 to only allow requests from authorized clients to go through to network directory server 125.

In certain implementations, the network directory service, the network access service and/or other components of distributed computer system 1000 may maintain audit logs to reflect requests to access the devices on private address space networks 100 by the hosts on central network 110.

Client 140 residing on central network 110 may need to communicate to a target device (e.g., target device 130A, which may be a computer, a printer or another networked peripheral device) residing on one of private address space networks (e.g., private address space network 100A). In various examples, client 140 may be configured to consume one or more types of computing resources that may be provided by various devices residing on private address space networks 110A-110C. Client 140 may be provided by any type of portable or non-portable computing devices, e.g., a desktop computer, a server, a portable computer, a portable media player, a tablet computer, a camera, a video camera, a gaming console, an electronic book reader or a mobile phone. In various examples, client 140 may have an integrated or external user interface (e.g., a GUI 142 integrated within the client computing device or a web user interface connected to the client via one or more networks).

In order to initiate communications with target device 130, client 140 may, responsive to issuing a request to the network directory service, receive a device access token and an identifier of network access server 115 that interconnects central network 110 to private address space network 100 on which target device 130 resides, as described in more details herein below with references to FIG. 2.

Figure 2:
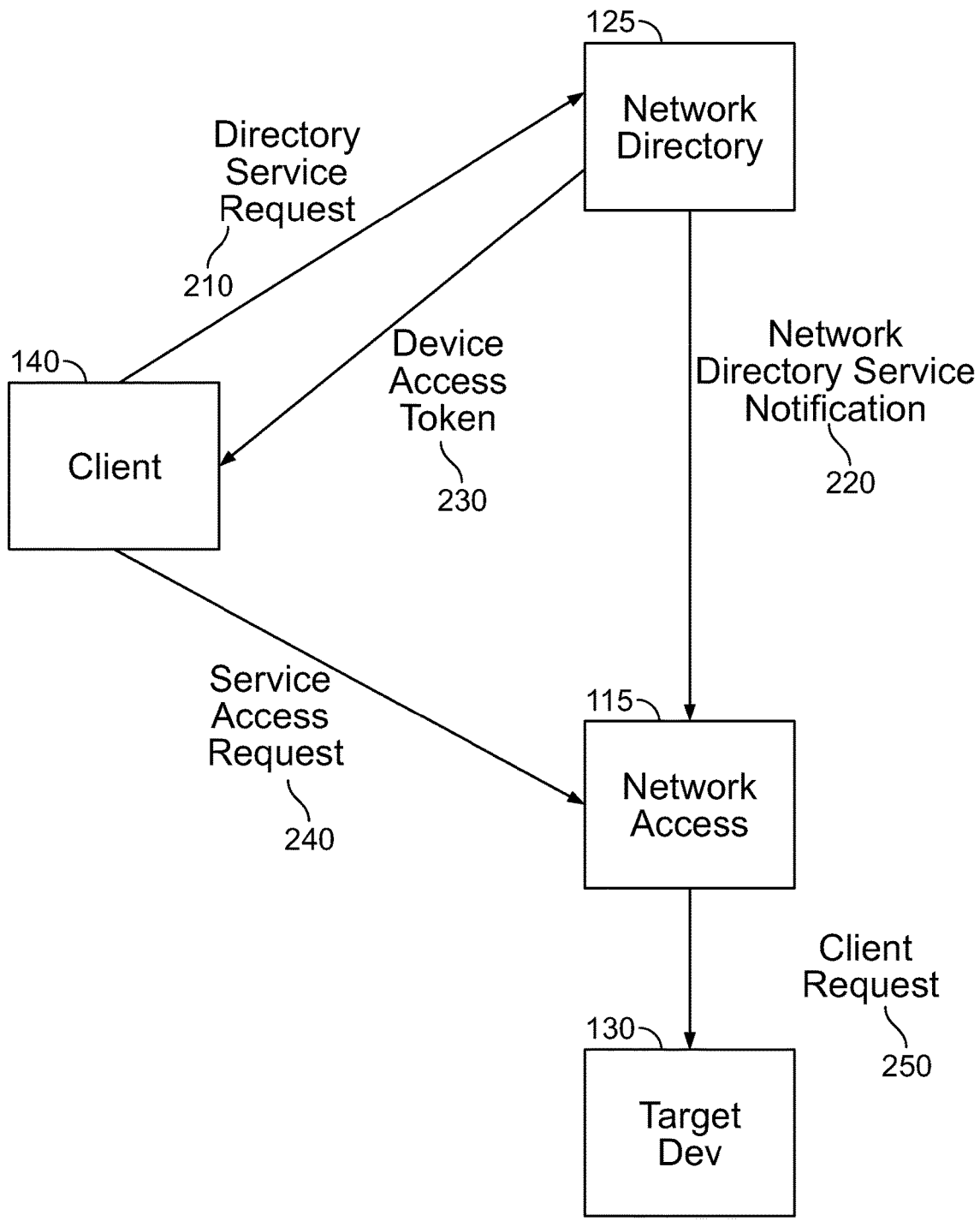
FIG. 2 schematically illustrates an example sequence of requests and responses flowing between various components of the distributed computer system.

FIG. 2 schematically illustrates an example sequence of requests and responses flowing between various components of distributed computer system 1000 of FIG. 1 in accordance with one or more aspects of the present disclosure. In the example of FIG. 2, client 140 may transmit a network directory request 210 comprising an identifier of target device 130 to network directory server 125. In an illustrative example, the target device identifier may be provided by an alphanumeric string representing an enterprise-wide unique identifier of target device 130.

In certain implementations, network directory request 210 may further include an identifier of a requested service on the target device 130. In various illustrative examples, the identifier of the requested service may be represented by a TCP port on which a daemon representing the requested service is listening or by a User Datagram Protocol (UDP) port on which the daemon is accepting incoming datagrams.

Before responding to the client's request, network directory server 125 may authenticate the requesting client. In certain implementations, network directory server 125 may authenticate the user of client device 140 by employing one or more authentication factors, such as a user password and/or a short-lived cryptographic nonce. In an illustrative example, network directory server 125 may transmit, to an external authentication service or a user directory service (not shown in FIG. 1), a client authentication request comprising the authentication factors supplied by the client. Alternatively, network directory server 125 may authenticate client 140 using a cryptographic certificate-based authentication scheme (e.g., X.509-compliant Public Key Infrastructure (PKI) certificates). In certain implementations, client 140 may be authenticated by network directory server 125 once per session. The latter may be represented, e.g., by a TCP connection established by client 140 to server 125. Alternatively, network directory server 125 may require client 140 to authenticate for each network directory request.

Upon authenticating client 140, network directory server 125 may verify the client's authorization to access the requested target device 130 and/or the requested service on target device 130. In an illustrative example, network directory server 125 may look up, in a data structure including authorization records, the client identifier, the target device identifier and/or the requested service identifier. The authorization records may reside in a memory and/or on a storage device accessible by network directory server 125. Alternatively, network directory server 125 may transmit an authorization request including the client identifier, the target device identifier and/or the requested service identifier to an external entitlement service (not shown in FIG. 1).

Upon authenticating the client and verifying the client's authorization to access the requested target device 130, network directory server 125 may determine (e.g., by looking up the target device identifier in the network directory) an identifier of a network access server 115 that interconnects the central network to a private address space network 100 on which target device 130 resides. In certain implementations, network directory server 125 may further determine the address of target device 130 on private address space network 100. Network directory server 125 may issue a device access token 230 to client 140, for presenting to network access server 115 in order to access target device 130. The device access token may be cryptographically encoded by a secret shared between network directory server 125 and network access server 115. Employing the network directory service for issuing cryptographically encoded device access tokens, while providing a mechanism for secure authentication of clients 140 by network access server 115, relieves client 140 from an otherwise necessary task of managing shared secrets with network access server 115 and/or other network access servers.

In certain implementations, the device access token may include the client identifier (e.g., the address of client 140 on central network 110), which network access server 115 may verify before allowing the network access request to proceed, thus preventing a malicious third party from unauthorized use of a device access token obtained by eavesdropping the exchange or requests and responses between client 140 and network directory server 125 via network 110. In certain implementations, the communication channel between client 140 and network directory server 125 may be secured to prevent the eavesdropping.

In certain implementations, the device access token may further include the target device identifier (e.g., represented by the address of target device 130 on private address space network 100). The device access token may further include the identifier of the requested service on the target device.

In certain implementations, the device access token may further include the expiration timestamp that network access server 115 may compare with a current time before allowing the network access request to proceed.

In certain implementations, the client may request network directory server 125 to extend a lifetime of a device access token. Responsive to receiving a request to extend a lifetime of a device access token, network directory server 125 may transmit to the client the device access token having an extended lifetime.

In certain implementations, the device access token may further include an identifier of the security scheme to be implemented by the network access server for communicating to the target device (e.g., a secure socket layer (SSL) connection, an X.509 certificate-based authentication, or a shared secret-based encryption). The device access token may further include an authentication token for the security scheme.

Upon identifying the network access server 115 that interconnects the central network to the private address space network on which the target device resides and further identifying the address of the target device on the private address space network, network directory server 125 may, in certain implementations, notify the identified network access server 115 of an expected connection request that may be initiated by client 140 presenting the device access token identifying the target device. Network directory server 125 may transmit, to network access server 115, a network directory service notification 220 identifying client 140 and target device 130. In certain implementations, network directory service notification 220 may further identify the requested service on target device 130.

In certain implementations, responsive to receiving network directory service notification 220 identifying target device 130, network access server 115 may, in anticipation of a connection request from client 140, prepare for establishing the client connection to target device 130 identified by network directory service notification 220.

In certain implementations, network access server 115 may determine the address of target device 130 on private address space network 100, e.g., by looking up the target device identifier in a network address directory. Alternatively, the address of target device 130 on private address space network 100 may be provided to network access server 115 as part of network directory service notification 220.

In an illustrative example, network access server 115 may initialize a NAT scheme to forward incoming network packets received on a designated TCP or UDP port to the requested service on target device 130, by substituting network addresses and port numbers within the packets transmitted by client 140 to target device 130, as described in more details herein below with references to FIG. 3A.

Alternatively, network access server 115 may implement a proxy server operating at and/or above the transport layer of the Open Systems Interconnection (OSI) model for accepting requests on behalf of one or more target devices 130 and forwarding the requests to the respective target device, as described in more details herein below with references to FIG. 3B.

As noted herein above, network access server 115 may initialize the NAT scheme and/or the proxy scheme responsive to receiving network directory service notification 220, thus preparing for an anticipated client request. Alternatively, network access server 115 may initialize the NAT scheme and/or the proxy scheme responsive to receiving and/or validating a service access request 240 from the client.

In certain implementations, responsive to receiving network directory service notification 220, network access server 115 may, in anticipation of a connection request from client 140, perform a health check of target device 130 and/or the requested service identified by network directory service notification 220, as described in more details herein above.

Responsive to issuing the device access token, the directory service may transmit a network directory service response 230 to client 140. The response message may include the device access token and the identifier of network access server 115 that interconnects central network 110 to private address space network 100 on which target device 130 resides.

Responsive to receiving network directory service response 230, client 140 may transmit, to network access server 115 identified by network directory service response 230, a service access request 240 including the device access token. In certain implementations, client 140 may transmit service access request 240 via a secure connection to network access server 115 (e.g., via an SSL connection).

Responsive to receiving service access request 240, network access server 115 may validate the service access request. In an illustrative example, the validation may comprise decrypting the device access token using the secret shared with the network directory server 125. In another illustrative example, network access server 115 may validate service access request 240 by matching the target device identifier, the target service identifier, and/or the identifier of the originating client to the corresponding fields of the previously received network directory service notification 220. Alternatively, network access server 115 may validate service access request 240 by transmitting, to the network directory server 125, a request validation message including the client identifier, the target device identifier and/or the requested service identifier. The network directory server 125 may then respond with a validation confirmation or rejection.

Responsive to validating the service access request, network access server 115 may forward the client request 250 associated with the target service to target device 130 on private address space network 100. In an illustrative example, network access server 115 may initialize a NAT scheme to forward incoming network packets received on a designated TCP or UDP port to the requested service on target device 130, by substituting network addresses and port numbers within the packets transmitted by client 140 to target device 130, as described in more details herein below with references to FIG. 3A. Alternatively, network access server 115 may implement a proxy server operating at and/or above the transport layer of the Open Systems Interconnection (OSI) model for accepting requests on behalf of one or more target devices 130 and forwarding the requests to the respective target device, as described in more details herein below with references to FIG. 3B.

In certain implementations, network access server 115 may validate client requests before forwarding them to target device 130. In an illustrative example, network access server 115 may validate the request by performing network packet inspection at the network layer of the OSI model (e.g., by comparing the network address of the originating client with the client identifier comprised by device access token 230 or network directory service notification 220). In another illustrative example, network access server 115 may validate the request by performing network packet inspection at the transport layer of the OSI model (e.g., by ascertaining that the network packets are addressed to a designated TCP or UDP port that is serviced by the NAT scheme or the proxy scheme). In another illustrative example, network access server 115 may validate the request by performing network packet inspection at the session layer of the OSI model (e.g., by ascertaining that one or more network packets belong to a session for which the requesting client has been authenticated and/or authorized). In another illustrative example, network access server 115 may validate the request by performing network packet inspection at the presentation layer of the OSI model (e.g., by decrypting the device access token using the secret shared with the network directory server 125). In another illustrative example, network access server 115 may validate the request by performing network packet inspection at the application layer of the OSI model (e.g., by ascertaining that one or more network packets comprise an application-level document having one or more expected features).

In certain implementations, network access server 115 may implement a secure connection for communicating to target device 130 (e.g., a secure socket layer (SSL) connection, an X.509 certificate-based authentication, or a shared secret-based encryption). In an illustrative example, the security scheme may be designated by one of the fields of the device access token, as described in more details herein above.

In certain implementations, network access server 115 may, responsive to detecting a pre-defined condition, disable the NAT scheme and/or the proxy server with respect to certain device access requests. In an illustrative example, network access server 115 may disable the NAT scheme and/or the proxy server with respect to device access requests accompanied by a particular device access token responsive to determining that the device access token has expired. In another illustrative example, network access server 115 may disable the NAT scheme and/or the proxy server with respect to device access requests accompanied by a particular device access token responsive to determining that the device access token has been revoked by the issuer (e.g., by network directory server 125). In another illustrative example, network access server 115 may disable the NAT scheme and/or the proxy server with respect to device access requests accompanied by a particular device access token responsive to failing to validate a service access request accompanied by the device access token, as described in more details herein above. In another illustrative example, network access server 115 may disable the NAT scheme and/or the proxy server with respect to device access requests to a particular target device responsive to determining that the target device is offline.

Figure 3A:
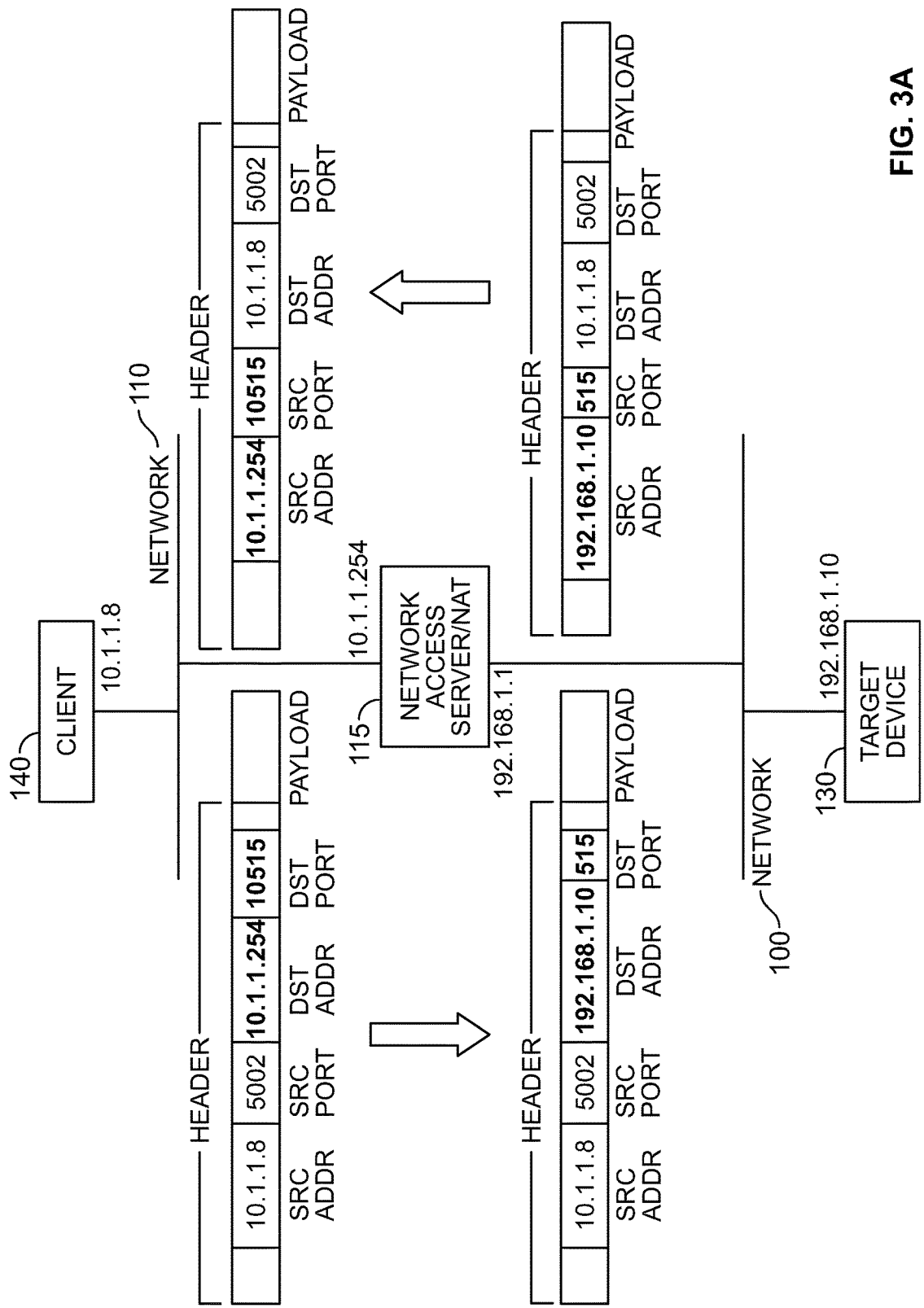
FIG. 3A schematically illustrates an example of a NAT scheme implemented by a network access server.

FIG. 3A schematically illustrates an example of a NAT scheme implemented by a network access server (e.g., by network access server 115 of FIG. 1). In certain implementations, network access server 115 may designate a TCP or UDP port on its external interface and implement a NAT scheme to forward the incoming IP packets received on the designated TCP or UDP port to the requested service on target device 130, by substituting IP addresses and port numbers within IP packets transmitted by client 140 to target device 130.

In accordance with the NAT scheme, network access server 115 may, responsive to receiving from client 140 an IP packet addressed to the designated TCP or UDP port on a network interface connected to central network 110, substitute the destination IP address in the packet header with the IP address of target device 130. Network access server 115 may also substitute the destination TCP or UDP port in the packet header with the TCP or UDP port number of the requested service. The source IP address and source TCP or UDP port of IP packets originated by client 140 are not modified. Once the address translation has been performed, network access server 115 may route the translated IP packet to target device 130.

Responsive to receiving a response IP packet addressed by target device 130 to client 140, network access server 115 may substitute the source IP address in the packet with the address of the external interface of network access server 115, and substitute the source TCP or UDP port in the packet header with the designated TCP or UDP port number. The destination IP address and destination TCP or UDP port of IP packets originated by target device 130 are not modified. Once the address translation has been performed, network access server 115 may route the translated IP packet to client 140.

In the illustrative example of FIG. 3A, target device 130 may run a printer service having a daemon listening on TCP port 515. Network access server 115 may implement a port forwarding scheme according to which an incoming IP packet 310 addressed to TCP port 10515 on external interface 320 will be routed to TCP port 515 on target device 130A, by substituting, within the headers of the incoming IP packets, the destination IP address of the external interface of network access server 115 (10.1.1.254) with the IP address of target device 130A on private address space network 100A (192.168.1.10), and by further substituting the destination TCP port number with the TCP port number on which printer service daemon listens on target device 130 (TCP port 515). The source IP address and source TCP port of IP packets originated by client 140 are not modified. Once the address translation has been performed, network access server 115 may route the translated IP packet to target device 130.

Network access server 115 may further route the response IP packets transmitted by the printer service to client 140, by performing the reverse address substitutions with respect to source IP addresses and source TCP ports. In the illustrative example of FIG. 3A, network access server 115 may substitute, within the headers of the outgoing IP packets, the source IP address target device 130 on private address space network 100 (192.168.1.10) with the IP address of the external interface of network access server 115 (10.1.1.254), and may further substitute the source TCP port number with the TCP port number (TCP port 10515) on which network access server 115 accepts incoming IP packets addressed to the printer service on target device 130A. The destination IP address and destination TCP or UDP port of IP packets originated by target device 130 are not modified. Once the address translation has been performed, network access server 115 may route the translated IP packet to client 140.

In certain implementations, network access server 115 may further perform packet filtering by discarding IP packets received on TCP port 10515 of the external interface, if those packets were not originated by client 140, thus preventing unauthorized access to the printer service by other hosts on central network 110.

Figure 3B:
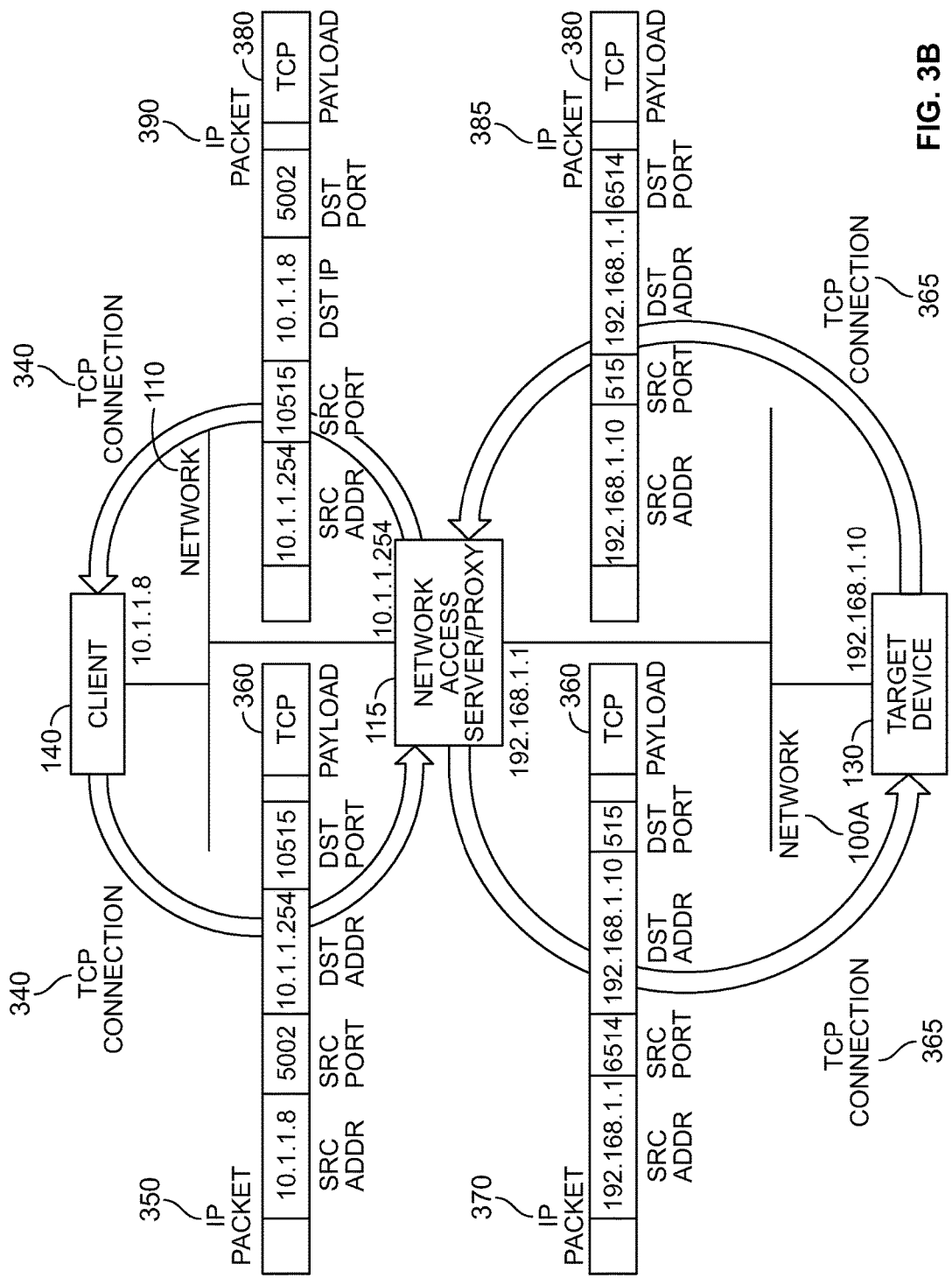
FIG. 3B schematically illustrates an example of a proxy scheme implemented by a network access server.

FIG. 3B schematically illustrates an example of a transport-layer proxy scheme implemented by a network access server (e.g., by network access server 115 of FIG. 1). In certain implementations, network access server 115 may designate a TCP or UDP port on its external interface and initialize a TCP or UDP proxy daemon that would listen on the designated port.

A TCP proxy daemon running on network access server 115 may act as a TCP server with respect to client 140 and may further act as a TCP client with respect to target device 130. Responsive to receiving, over a first TCP connection initiated by client 140, an incoming TCP packet from client 140, the TCP proxy daemon may forward the TCP packet over a second TCP connection initiated by the TCP proxy daemon to target device 130. Responsive to receiving, over the second TCP connection, a response TCP packet from target device 130, the TCP proxy daemon may forward the TCP packet over the first TCP connection to client 140.

Similarly, a UDP proxy daemon running on network access server 115 may act as a UDP server with respect to client 140 and may further act as a UDP client with respect to target device 130. Responsive to receiving an incoming UDP datagram from client 140, the UDP proxy daemon may forward the UDP datagram to target device 130. Responsive to receiving a response UDP datagram from target device 130, the UDP proxy daemon may forward the UDP datagram to client 140.

In the illustrative example of FIG. 3B, target device 130 may run a printer service having a daemon listening on TCP port 515. A TCP proxy daemon running on network access server 115 may act as a TCP server with respect to client 140 and may further act as a TCP client with respect to target device 130. Responsive to receiving, over a first TCP connection 340 initiated by client 140, an incoming IP packet 350 originated by client 140 and addressed to TCP port 10515 on external interface 320 of network access server 115, the TCP proxy daemon may extract a TCP packet 360 representing the payload of incoming IP packet 350 and forward TCP packet 360, over a second TCP connection 365 initiated by the TCP proxy daemon, to target device 130, as the payload of outgoing IP packet 370. Responsive to receiving, over the second TCP connection, a response TCP packet 380 encapsulated into IP packet 385 originated by target device 130, the TCP proxy daemon may forward response TCP packet 380 to client 140 over the first TCP connection as the payload of outgoing IP packet 390.

Various implementations of methods related to providing network directory and access services in accordance with one or more aspect of the present disclosure are described herein below with references to FIGS. 4-6. The methods may be performed by processing logic that may include hardware (circuitry, dedicated logic, etc.), software (such as is run on a general purpose computing device or a dedicated machine) or a combination of both. In certain implementations, the method described with reference to FIG. 4 may be performed by network directory server 125 of FIG. 1, the method described with reference to FIG. 5 may be performed by network access server 115 of FIG. 1, and the method described with reference to FIG. 6 may be performed by client 140 of FIG. 1.

For simplicity of explanation, the methods are depicted and described as a series of acts. However, acts in accordance with this disclosure may occur in various orders and/or concurrently with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 4:
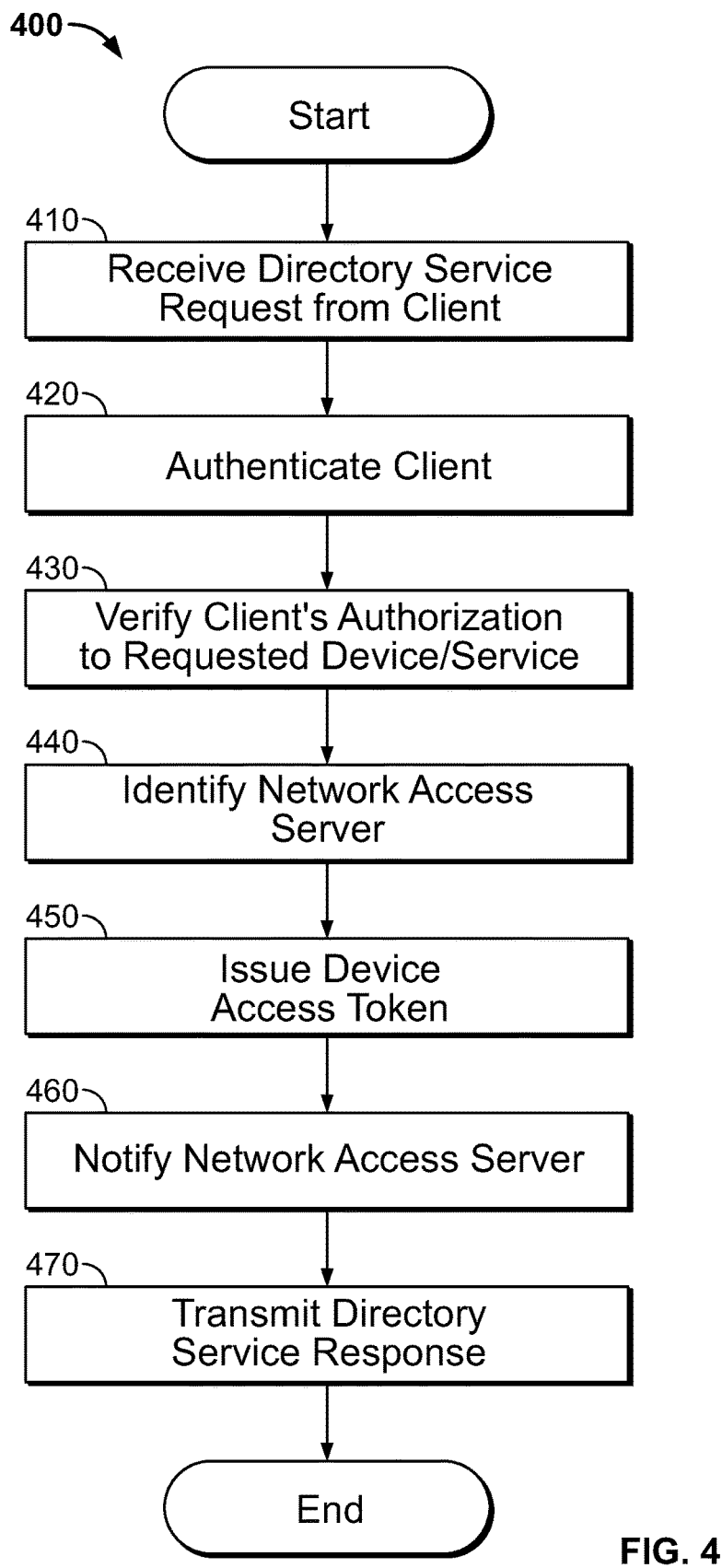
FIG. 4 is a flow diagram of an illustrative example of a method for processing a network directory request by a network directory server.

FIG. 4 depicts a flow diagram of an illustrative example of a method 400 for processing a network directory request by network directory server 125 of FIG. 1. At block 410, the processing logic implementing the method receives a network directory request including an identifier of a target device that resides on a private address space network. In certain implementations, the network directory request may further include an identifier of the requested service on the target device (e.g., represented by the TCP port on which a daemon representing the requested service is listening or by the UDP port on which the daemon is accepting incoming datagrams).

At block 420, the processing logic authenticates the client that has originated the request. In certain implementations, the processing logic may authenticate the user of the client device by employing one or more authentication factors, such as a user password and/or a short-lived cryptographic nonce. In an illustrative example, the processing logic may transmit, to an external authentication or a user directory service, a client authentication request comprising the authentication factors supplied by the client. Alternatively, the processing logic may authenticate the client using a cryptographic certificate-based authentication scheme (e.g., X.509-compliant PKI certificates).

At block 430, the processing logic verifies the client's authorization to access the requested target device. In certain implementations, the processing logic may further verify the client's authorization to access the requested service on the target device. In certain implementations, the processing logic may lookup the client identifier, the target device identifier and/or the requested service identifier in a data structure comprising authorization records. Alternatively, the processing logic may transmit, to an external entitlement service, an authorization request comprising the client identifier, the target device identifier and/or the requested service identifier.

At block 440, the processing logic determines (e.g., by looking up the target device identifier in the network directory) an identifier of the network access server that interconnects the central network to the private address space network on which the target device resides.

At block 450, the processing logic issues a device access token that the client would present to the network access server in order to access the target device. In certain implementations, the device access token may be cryptographically encoded by a secret shared between the network directory server and the network access server. The device access token may include the client identifier, the target device identifier, and the requested service identifier, as described in more details herein above.

At block 460, the processing logic notifies the identified network access server of an expected connection request that may be initiated by the requesting client presenting the issued device access token to the network access server. The processing logic transmits, to the identified network access server, a network directory service notification identifying the client and the target device. In certain implementations, the network directory service notification may further identify the requested service on the target device.

At block 470, the processing logic transmits a network directory service response to the requesting client. The response message may include the device access token and the identifier of the network access server that interconnects the central network to the private address space network on which the target device resides. Responsive to completing the operations described with references to block 460, the method terminates.

Figure 5:
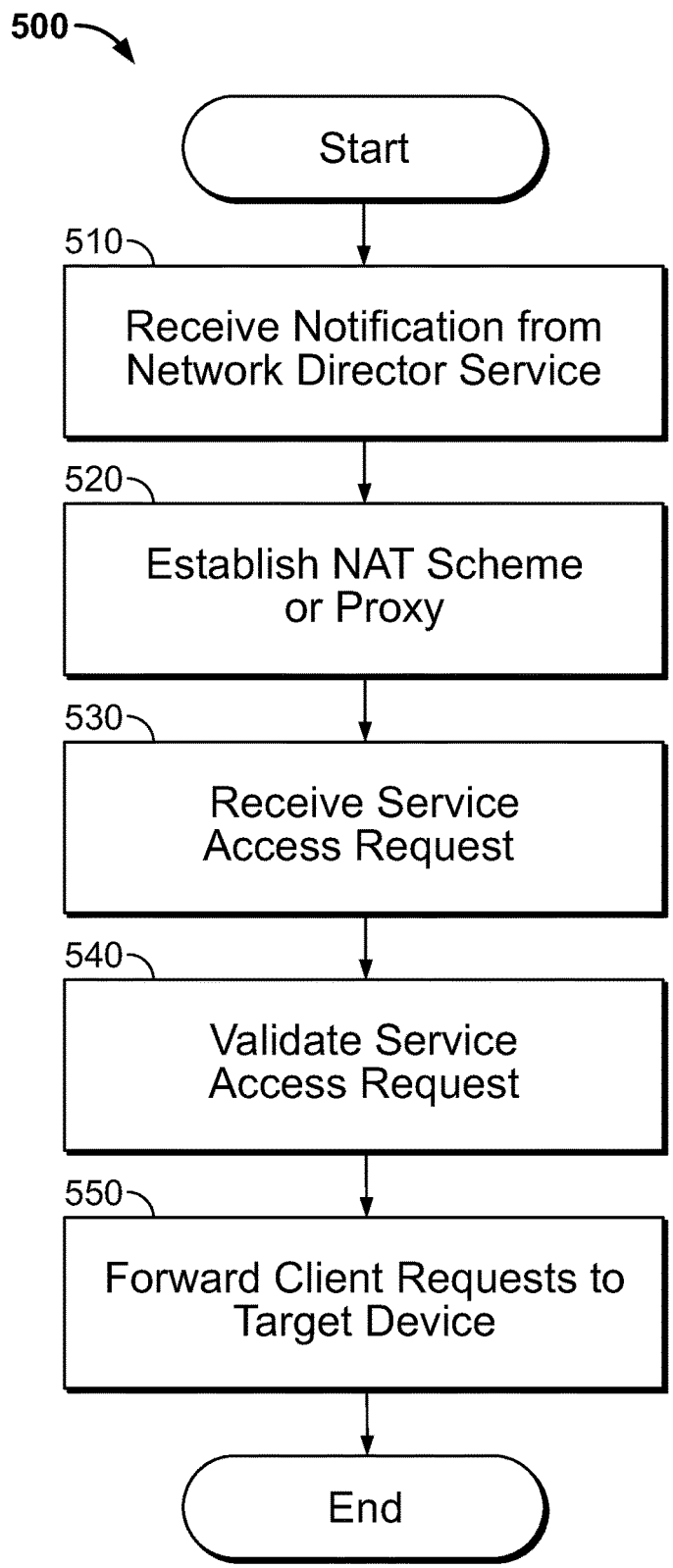
FIG. 5 a flow diagram of an illustrative example of a method for routing client requests by a network access server.

FIG. 5 depicts a flow diagram of an illustrative example of a method 500 for routing client requests by network access server 115 of FIG. 1.

At block 510, the processing logic implementing the method receives, from a network directory server, a notification message comprising a client identifier and an address of a target device on a private address space network.

At block 520, the processing logic establishes a NAT scheme for routing incoming client requests to the target device or a proxy scheme for forwarding incoming client requests to the target device, as described in more details herein above.

In certain implementations, the processing logic may designate a TCP or UDP port on the external interface of the network access server interconnecting the central network and the private address space network on which the target device resides, and implements a NAT scheme to forward the incoming IP packets received on the designated TCP or UDP port to the requested service on the target device. The NAT scheme may define one or more rules for substituting IP addresses and port numbers within IP packets transmitted by the client to the target device, as described in more details herein above.

Alternatively, the processing logic may designate a TCP or UDP port on its external interface and initialize a TCP or UDP proxy daemon that would listen on the designated port. The TCP proxy daemon may act as a TCP server with respect to clients residing on the central network and may further act as a TCP client with respect to target devices residing on the private address space network. Responsive to receiving, over a first TCP connection initiated by a client, an incoming TCP packet from the client, the TCP proxy daemon may forward the TCP packet over a second TCP connection initiated by the TCP proxy daemon to a target device. Responsive to receiving, over the second TCP connection, a response TCP packet from the target device, the TCP proxy daemon may forward the TCP packet to the client over the first TCP connection, as described in more details herein above.

Similarly, the UDP proxy daemon running on the network access server may act as a UDP server with respect to clients residing on the central network and may further act as a UDP client with respect to target devices residing on the private address space network. Responsive to receiving an incoming UDP datagram from a client, the UDP proxy daemon may forward the UDP datagram to a target device. Responsive to receiving a response UDP datagram from the target device, the UDP proxy daemon may forward the UDP datagram to the client, as described in more details herein above.

At block 530, the processing logic receives, from a client, a service access request and a device access token identifying the target device for which a notification had earlier been received from the network directory server.

At block 540, the processing logic validates the service access request. In certain implementations, the processing logic may validate the service access request. In an illustrative example, the validation may comprise decrypting the device access token using the secret shared with the network directory server. In another illustrative example, the processing logic may validate the service access request by matching the target device identifier, the target service identifier, and/or the identifier of the originating client to the corresponding fields of the previously received network directory service notification. Alternatively, the processing logic may validate the service access request by transmitting, to the network directory server, a request validation message including the client identifier, the target device identifier and/or the requested service identifier, as described in more details herein above.

At block 550, the processing logic forwards the client requests associated with the target service to the IP address of the target device on the private address space network, e.g., by performing network address translation with respect to the IP packets flowing between the client and the target device in accordance with the established NAT scheme or proxy scheme.

In certain implementations, the processing logic may validate client requests before forwarding them to the target device. In an illustrative example, the processing logic may validate the request by performing network packet inspection at the network layer of the OSI model (e.g., by comparing the network address of the originating client with the client identifier comprised by the device access token or the network directory service notification). In another illustrative example, the processing logic may validate the request by performing network packet inspection at the transport layer of the OSI model (e.g., by ascertaining that the network packets are addressed to a designated TCP or UDP port that is serviced by the NAT scheme or the proxy scheme). In another illustrative example, the processing logic may validate the request by performing network packet inspection at the session layer of the OSI model (e.g., by ascertaining that one or more network packets belong to a session for which the requesting client has been authenticated and/or authorized). In another illustrative example, the processing logic may validate the request by performing network packet inspection at the presentation layer of the OSI model (e.g., by decrypting the device access token using the secret shared with the network directory server). In another illustrative example, the processing logic may validate the request by performing network packet inspection at the application layer of the OSI model (e.g., by ascertaining that one or more network packets comprise an application-level document having one or more expected features).

In certain implementations, the processing logic may, responsive to detecting a pre-defined condition, disable the NAT scheme and/or the proxy server with respect to certain device access requests. In an illustrative example, the processing logic may disable the NAT scheme and/or the proxy server with respect to device access requests accompanied by a particular device access token responsive to determining that the device access token has expired. In another illustrative example, the processing logic may disable the NAT scheme and/or the proxy server with respect to device access requests accompanied by a particular device access token responsive to determining that the device access token has been revoked by the issuer (e.g., by the network directory server). In another illustrative example, the processing logic may disable the NAT scheme and/or the proxy server with respect to device access requests accompanied by a particular device access token responsive to failing to validate a service access request accompanied by the device access token, as described in more details herein above. In another illustrative example, the processing logic may disable the NAT scheme and/or the proxy server with respect to device access requests to a particular target device responsive to determining that the target device is offline.

Responsive to completing the operations described with references to block 550, the method terminates.

Figure 6:
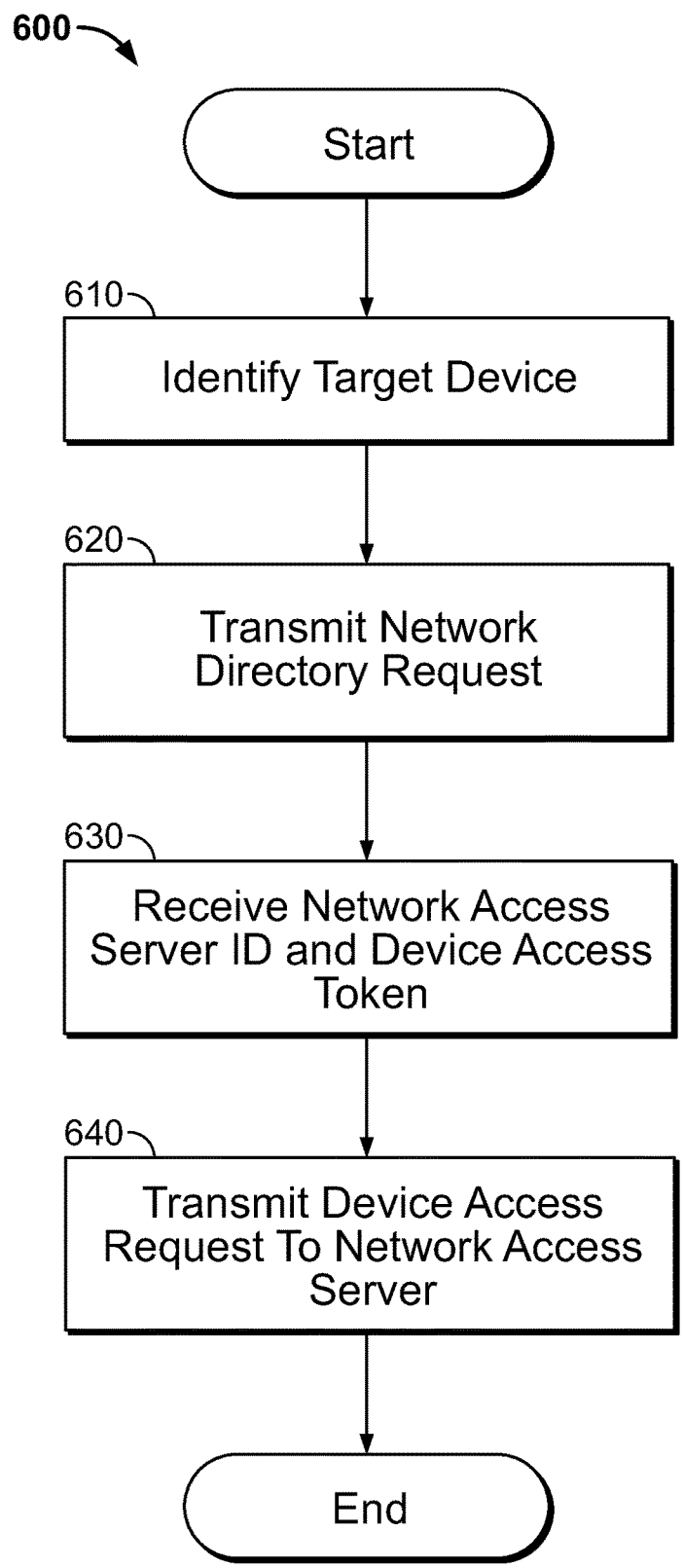
FIG. 6 a flow diagram of an illustrative example of a method for accessing a target device by a client.

FIG. 6 is a flow diagram of an illustrative example of a method 600 for accessing a target device by a client. At block 610, the processing logic implementing the method determines (e.g., by receiving from an application being executed by the client computing device) an enterprise-wide unique identifier of the target device to be accessed. The identifier of the target device may be provided by an alphanumeric string. In certain implementations, the processing logic may further determine an identifier of a service (e.g., represented by the TCP port on which a daemon representing the requested service is listening or by the UDP port on which the daemon is accepting incoming datagrams) being executed by the target device.

At block 620, the processing logic transmits, to a network directory service, a network directory request comprising the identifier of the target device. In certain implementations, the network directory request may further include an identifier of the service on the target device.

At block 630, the processing logic receives, from the network directory server, a response comprising an identifier of a network access server and a device access token for the requested device and/or service.

At block 640, the processing logic transmits, to the network access server, a device access request accompanied by the device access token. Responsive to completing the operations described with references to block 640, the method terminates.

Figure 7:
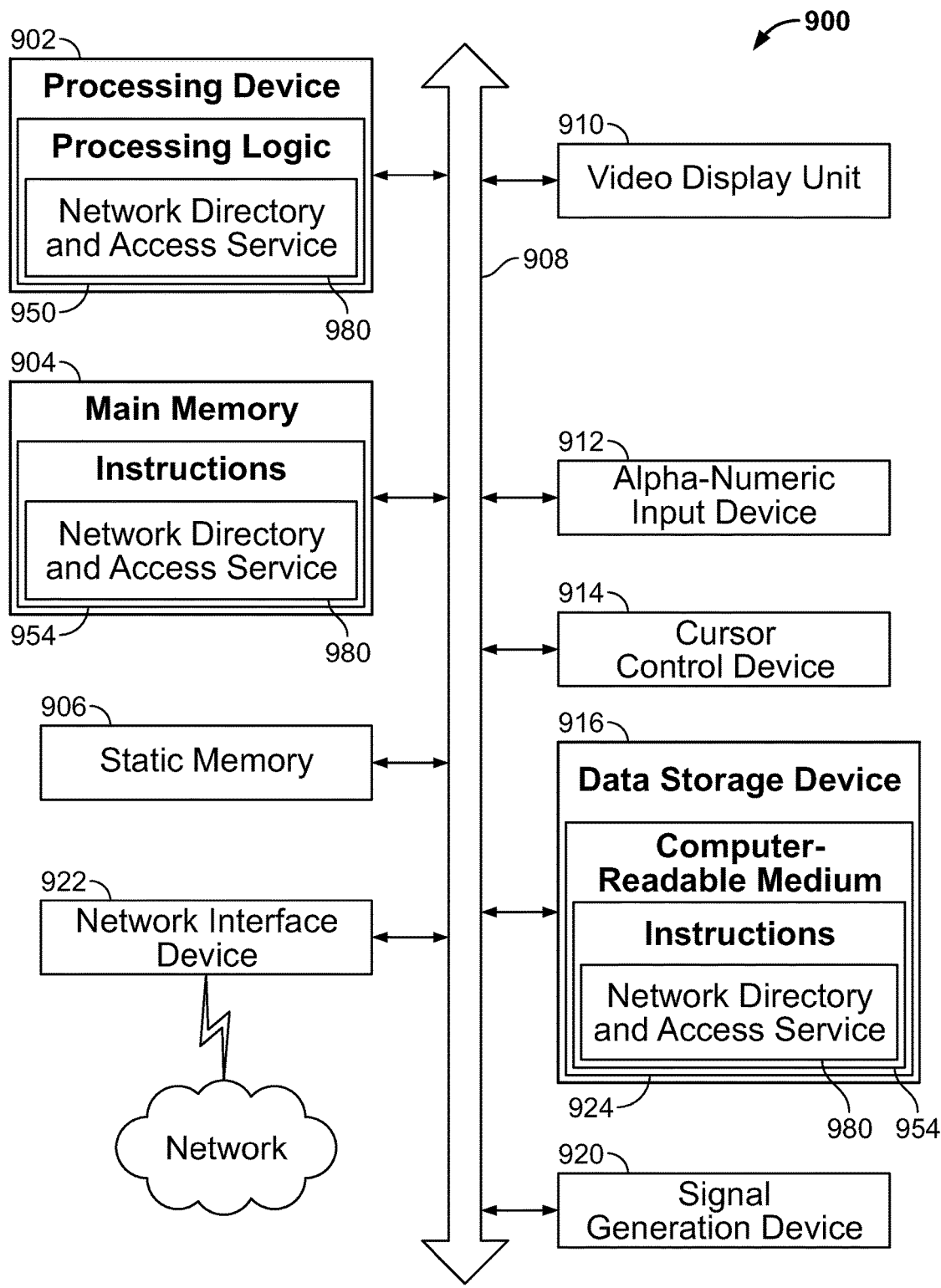
FIG. 7 is a block diagram of an example computing device, which may perform operations in accordance with one or more aspects of the present disclosure.

FIG. 7 is a block diagram of an example computing device 900, which may perform operations in accordance with one or more aspects of the present disclosure. A set of instructions for causing computing device 900 to perform any one or more of the methodologies discussed herein may be executed by computing device 900. Computing device 900 may correspond to a computing device of client 140, network directory server 125, network access server 115 or target device 130 of FIG. 1.

In various implementations, the computing device may be connected to other computing devices by a network provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

Exemplary computing device 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.) and a data storage device 916, which communicate with each other via a bus 908.

Processing device 902 represents one or more general-purpose processors such as a microprocessor, central processing unit or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. Processing device 902 may therefore include multiple processors. Processing device 902 may include a complex instruction set computing (CISC) microprocessor, reduced instruction set computing (RISC) microprocessor, very long instruction word (VLIW) microprocessor, processor implementing other instruction sets or processors implementing a combination of instruction sets. Processing device 902 may also be one or more special-purpose processing devices such as an application specific integrated circuit (ASIC), a field programmable gate array (FPGA), a digital signal processor (DSP), network processor or the like.

Computing device 900 may further include one or more network interface device 922. Computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker).

Data storage device 916 may include a computer-readable storage medium 924 on which is stored one or more sets of instructions 954 embodying any one or more of the methods or functions described herein (e.g., for a method 400 for processing network directory requests by network directory server 125 of FIG. 1, method 500 for routing client requests by network access server 115 of FIG. 1 and/or method 600 for accessing a target device by client 140 of FIG. 1). Instructions 954 may also reside, completely or at least partially, within main memory 904 and/or within processing device 902 during execution thereof by the computing device 900; main memory 904 and processing device 902 also constituting machine-readable storage media.

While computer-readable storage medium 924 is shown in the example of FIG. 7 to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium other than a carrier wave that is capable of storing or encoding a set of instructions for execution by the computing device that cause the computing device to perform any one or more of the methodologies of the present disclosure. The term "computer-readable storage medium" shall accordingly be taken to include, but not be limited to, non-transitory media such as solid-state memories, optical and magnetic media.

The modules, components and other features described herein may be implemented as discrete hardware components or integrated in the functionality of hardware components such as ASICS, FPGAs, DSPs or similar devices. In addition, the modules may be implemented as firmware or functional circuitry within hardware devices. Further, the modules may be implemented in any combination of hardware devices and software components or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "associating", "forwarding", "receiving", "determining", "transmitting" or the like, refer to the actions and processes of a computing device or similar electronic computing device, that manipulates and transforms data represented as physical (e.g., electronic) quantities within the computing device's registers and memories into other data similarly represented as physical quantities within the computing device memories or registers or other such information storage devices.

The apparatus for performing the operations described herein may be specially constructed for the required purposes, or it may include a general purpose computer selectively activated or reconfigured by a computer program stored in the computer. Such a computer program may be stored in a computer readable storage medium, such as, but not limited to, any type of disk including optical disks, CD-ROMs, magnetic-optical disks, read-only memories (ROMs), random access memories (RAMs), electrically programmable read only memories (EPROMs), electrically erasable programmable read only memories (EEPROMs), magnetic or optical cards or any type of media suitable for storing electronic instructions.

It is to be understood that the above description is intended to be illustrative and not restrictive. Various other implementations will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
  receiving from a client, by a first processing device coupled to a first network, an identifier of a first target device;
  selecting, among a second network connected by a first router to the first network and a third network connected by a second router to the first network, a target network that is coupled to the first target device, wherein the second network and the third network share a private network address space;
  identifying a target router that is coupled to the first network and to the target network;
  transmitting, to the client, an identifier of the target router and a device access token identifying the first target device;
  transmitting, to the target router, a network directory message identifying the client and the first target device;
  receiving, from the client, by the target router, a service request comprising the device access token;
  validating the service request by comparing the first target device identified by the network directory message to a second target device identified by the device access token received from the client; and
  forwarding the service request to the first target device.

2. The method of claim 1, further comprising authenticating the client by the first processing device.

3. The method of claim 1, further comprising ascertaining, by the first processing device, whether the client is authorized to access the first target device.

4. The method of claim 1, further comprising initializing, the target router for routing requests from the client on the first network to the first target device, one of a network address translation (NAT) scheme or a proxy scheme.

5. The method of claim 1, further comprising discovering, by the first processing device, the first target device by performing at least one of: analyzing a plurality of addresses assigned by a dynamic host configuration protocol (DHCP) server to network devices identified by MAC addresses, sniffing traffic on at least one of the second network or the third network, scanning at least one of the second network or the third network or receiving a message from the first target device.

6. The method of claim 5, further comprising assigning a device descriptor to the first target device.

7. A computer system, comprising:
a memory; and
a processing device operatively coupled to the memory, the processing device to:
- receive, from a directory server, over a first network, a network directory message comprising an identifier of a client and an identifier of a first target device;
- select, among a second network connected to the first network and a third network connected to the first network, a target network coupled to the first target device, wherein the second network and the third network share a common network address space;
- configure a router that connects the target network to the first network to route requests from the client on the first network to the first target device, using one of a network address translation (NAT) scheme or a proxy scheme;
- receive, from the client, a service request associated with a device access token identifying a second target device;
- validate the device access token using a secret shared between the computer system and the directory server;
- validate the service request by comparing the first target device identified by the network directory message to a second target device identified by the device access token received from the client; and
- forward the service request to the first target device.

8. The computer system of claim 7, wherein the processing device is further to:
forward a response from the first target device to the client.

9. The computer system of claim 7, wherein the processing device is to receive the service request from the client over a secure connection.

10. The computer system of claim 7, wherein the device access token comprises at least one of: an identifier of a security scheme to be implemented by the processing device for communicating to the first target device or an authentication token for the security scheme.

11. The computer system of claim 10, wherein the processing device is to implement the security scheme to secure communications to the first target device for forwarding the service request to the first target device.

12. The computer system of claim 7, wherein the processing device is to configure the router responsive to one of: receiving the network directory message or validating the device access token.

13. The computer system of claim 7, wherein the processing device is further to:
perform a health check of the first target device by performing at least one of: communicating with the first target device, inspecting state information of network devices or performing a device-specific procedure.

14. The computer system of claim 7, wherein at least one of the network directory message and the device access token further comprises an identifier of a service on the first target device.

15. The computer system of claim 7, wherein the processing device is further to:
responsive to receiving, from the client, a packet addressed to a network interface connected to the first network, substitute a destination address in the packet with the address of the first target device.

16. The computer system of claim 15, wherein the processing device is further to:
implement a transport layer proxy for forwarding the message to the first target device.

17. The computer system of claim 7, wherein the processing device is further to:
disable the NAT scheme or the proxy server responsive to evaluating a pre-defined condition.

18. The computer system of claim 17, wherein the evaluating comprises at least one of: determining that the device access token has expired, determining that the first target device is off-line, determining that the device access token has been revoked or failing to validate the service request.

* * * * *